US007182328B2

(12) United States Patent
Teague et al.

(10) Patent No.: US 7,182,328 B2
(45) **Date of Patent: *Feb. 27, 2007**

(54) SPRING PIN ASSEMBLY

(75) Inventors: Jeff Teague, Hickory, NC (US); John Woods, Morganton, NC (US); Rodney Hall, Morganton, NC (US); Mike Powell, Hickory, NC (US); Mike Rice, Morganton, NC (US); Keith Cline, Marion, NC (US)

(73) Assignee: Cogsdill Tool Products, Inc., Lugoff, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/447,737

(22) Filed: Jun. 6, 2006

(65) Prior Publication Data

US 2006/0226590 A1 Oct. 12, 2006

Related U.S. Application Data

(63) Continuation of application No. 10/938,799, filed on Sep. 10, 2004, now Pat. No. 7,086,643.

(60) Provisional application No. 60/502,110, filed on Sep. 11, 2003.

(51) Int. Cl.
*B23Q 3/00* (2006.01)

(52) U.S. Cl. ...................................... 269/305; 269/900

(58) Field of Classification Search ................ 269/305, 269/900, 303–319, 289 R
See application file for complete search history.

(56) References Cited

U.S. PATENT DOCUMENTS

| | | | | |
|---|---|---|---|---|
| 2,955,820 | A | 10/1960 | Berg | |
| 3,757,561 | A | 9/1973 | Rupert | |
| 3,771,780 | A | 11/1973 | Doocey | |
| 4,157,819 | A | 6/1979 | Meyer | |
| 4,793,603 | A | 12/1988 | Wöber et al. | |
| 4,832,325 | A | 5/1989 | Okolischan et al. | |
| 5,114,334 | A | 5/1992 | Boskovic | |
| 5,505,438 | A | 4/1996 | Baldwin et al. | |
| 5,676,024 | A | 10/1997 | Yoshida et al. | |
| 5,735,514 | A | 4/1998 | Moore et al. | |
| 6,145,522 | A | 11/2000 | Ko | |
| 6,439,083 | B1 | 8/2002 | Molstad | |
| 6,543,973 | B2 | 4/2003 | Lapikas et al. | |
| 7,086,643 | B2 * | 8/2006 | Teague et al. | 269/305 |
| 2006/0226590 | A1 * | 10/2006 | Teague et al. | 269/305 |

* cited by examiner

*Primary Examiner*—Lee D. Wilson
(74) *Attorney, Agent, or Firm*—Howard & Howard Attorneys, P.C.

(57) ABSTRACT

The subject invention provides a work support apparatus (20) including a spring pin assembly (32) for biasing a work piece (22) against a work stop (24), which includes a table (26) having a recess (30) with the spring pin assembly (32) disposed therein. The spring pin assembly (32) includes a housing having a side wall (48) and a top wall (50) having a circular opening (52) therethrough and a domed inner surface (54) extending upwardly from the side wall (48). A retaining pin (40) having a flat bottom surface (56) and a semi-spherical bottom portion (58) is urged against the domed inner surface (54) by a compression spring (42). A spring cup (44) transmits forces between the compression spring (42) and the flat bottom surface (56) of the retaining pin (40). A tool receiving device receives a tool for operating a holding mechanism (34) for securing the spring pin assembly (32) in the recess (30) such that the spring pin assembly (32) is removable from the top surface (28) of the table (26).

17 Claims, 4 Drawing Sheets

SPRING PIN ASSEMBLY

RELATED APPLICATION

This application is a continuation of prior U.S. patent application Ser. No. 10/938,799, filed Sep. 10, 2004 now U.S. Pat. No. 7,086,643, which claims the benefit of U.S. Provisional Patent Application Ser. No. 60/502,110, filed on Sep. 11, 2003.

BACKGROUND OF THE INVENTION

1. Field of the Invention

The subject invention relates to a work support apparatus. More specifically, the subject invention relates to a work support apparatus including a spring pin assembly for biasing a work piece against a stop.

2. Description of the Prior Art

In machining operations, it is necessary to position a work piece accurately at each station before performing work on it. Sometimes, this is accomplished by using a work support apparatus including a spring actuated locating pin assembly (spring pin assembly) to locate the work piece against a work stop by providing a lateral pressure between the work piece and the stop. Additionally, it is often necessary to retain the work piece at each station prior to introducing a primary means of securing the work piece. The spring pin assembly is required to act on a work piece in more than one axis to sufficiently retain the work piece. The combined reaction forces from the spring pin assembly and opposing stop sufficiently retain the work piece by applying force in multiple axis'.

The U.S. Pat. No. 4,793,603 to Wober et al. discloses a spring pin assembly that comprises a retaining pin partially enclosed in a cylindrical housing and insertable with the housing in a recess of a table. The cylindrical housing is press fit into the table. The housing is level or below a top surface of the table so that only an upper portion of the retaining pin is exposed above the top surface of the table. The retaining pin is provided with a flange that abuts the housing wall and is pressed against an inwardly angled rim of the housing by a compression spring disposed in the housing between the flange and a bottom portion of the housing. The flange of the retaining pin is provided with a curved side surface with which it abuts the housing wall. This curved side surface of the flange permits a deflection of the retaining pin and a simultaneous tilting of the flange, without the flange losing its guidance on the housing wall. The retaining pin is deflectable in every direction out of its normal position and is counter to the spring force. The spring force tends to press the retaining pin back into its normal upright position. Although the retaining pin may exhibit any desired shape, it has been found convenient if it is constructed as a cylindrical pin and provided with a rounded crest protruding out of the housing. Alternatively, the retaining pin may also be provided with a spherical or conical head if desired.

Spring pin assemblies, as described in U.S. Pat. No. 4,793,603 to Wober et. al. have been in use for many years. However, they do have some problems associated with their use. Most notably is that the spring pin assemblies of this type are press fit into the recess of the table. In order to remove the spring pin assembly from the table, it must be pressed out of the table from the opposing back side of the table. This often requires removing the table to gain access to the back side thereof. Often, once the spring pin assembly is removed, the housing looses the original press fit which often renders the spring pin assembly unusable. Another problem with the spring pin assemblies of this type is that the spring pin assemblies become contaminated with metal fines from the machining operation. When the locating pin pivots within the housing, an opening is created between the flange of the locating pin and the housing that allows the metal fines to enter. Over time, this accumulation of metal fines causes the spring actuated locating pin to fail. Yet another problem with the spring pin assemblies of this type is that the spring pin assembly does not provide for variation in sizes of the work piece other than that allowed by the locating pin range of motion.

SUMMARY OF THE INVENTION AND ADVANTAGES

The subject invention provides a work support apparatus for positioning a work piece against a stop. The work support apparatus includes a table having a top surface and a recess therein. A spring pin assembly is disposed in the recess and extends above the top surface of the table for biasing the work piece against the stop. A holding mechanism removably retains the spring pin assembly in the recess without interfering with the movement of the work piece over the top surface of the table. The apparatus includes a tool receiving device disposed below the top surface of the table for engaging the holding mechanism with a tool below the top surface of the table for installing and removing the spring pin assembly from the recess in the table.

Accordingly, the subject invention provides a work support apparatus including a spring pin assembly that is repeatably removable and installable in the recess of the table from the top surface thereof.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
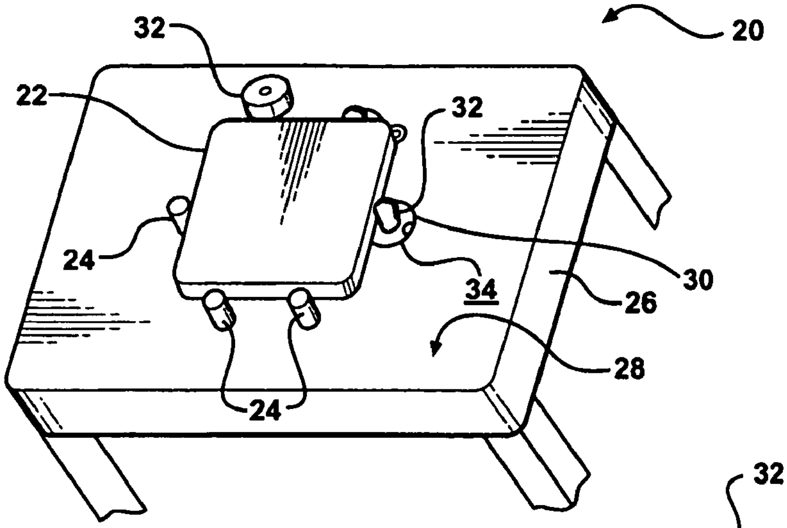
FIG. 1 is a perspective view of the work support apparatus.

Referring to the Figures, wherein like numerals indicate like parts throughout the several views, a work support apparatus is generally shown at in FIG. 1. The work support apparatus (20) positions a work piece (22) against a stop (24). The work support apparatus (20) includes a table (26) having a top surface (28) and a recess (30) therein. A spring pin assembly, generally shown at (32), is disposed in the recess (30) and extends above the top surface (28). The spring pin assembly (32) biases the work piece (22) against the stop (24). A holding mechanism, generally shown at (34), removably retains the spring pin assembly (32) in the recess (30) without interfering with movement of the work piece (22) over the top surface (28). The table (26) supports the work piece (22) and may include a plurality of spring pin assemblies (32). Each spring pin assembly (32) is disposed within a recess (30) in the table (26) as described above.

The apparatus is characterized by a tool receiving device (36) disposed below the top surface (28) of the table (26) for engaging the holding mechanism (34) with a tool below the top surface (28) of the table (26). The tool receiving device (36) is defined as a tool void (68) for receiving the tool. The tool engages the tool void (68) for operating the holding mechanism (34). In the preferred embodiment, the tool engages the tool void (68) for rotating the holding mechanism (34) for securing or releasing the spring pin assembly (32) from within the recess (30). The tool may include a device such as a screwdriver, an allen wrench, or some other device for engaging the tool void (68). The tool receiving device (36) is accessible through the plane of the top surface (28) of the table (26) such that the spring pin assembly (32) may be repeatably installed and removed from the top surface (28) of the table (26).

Figure 2:
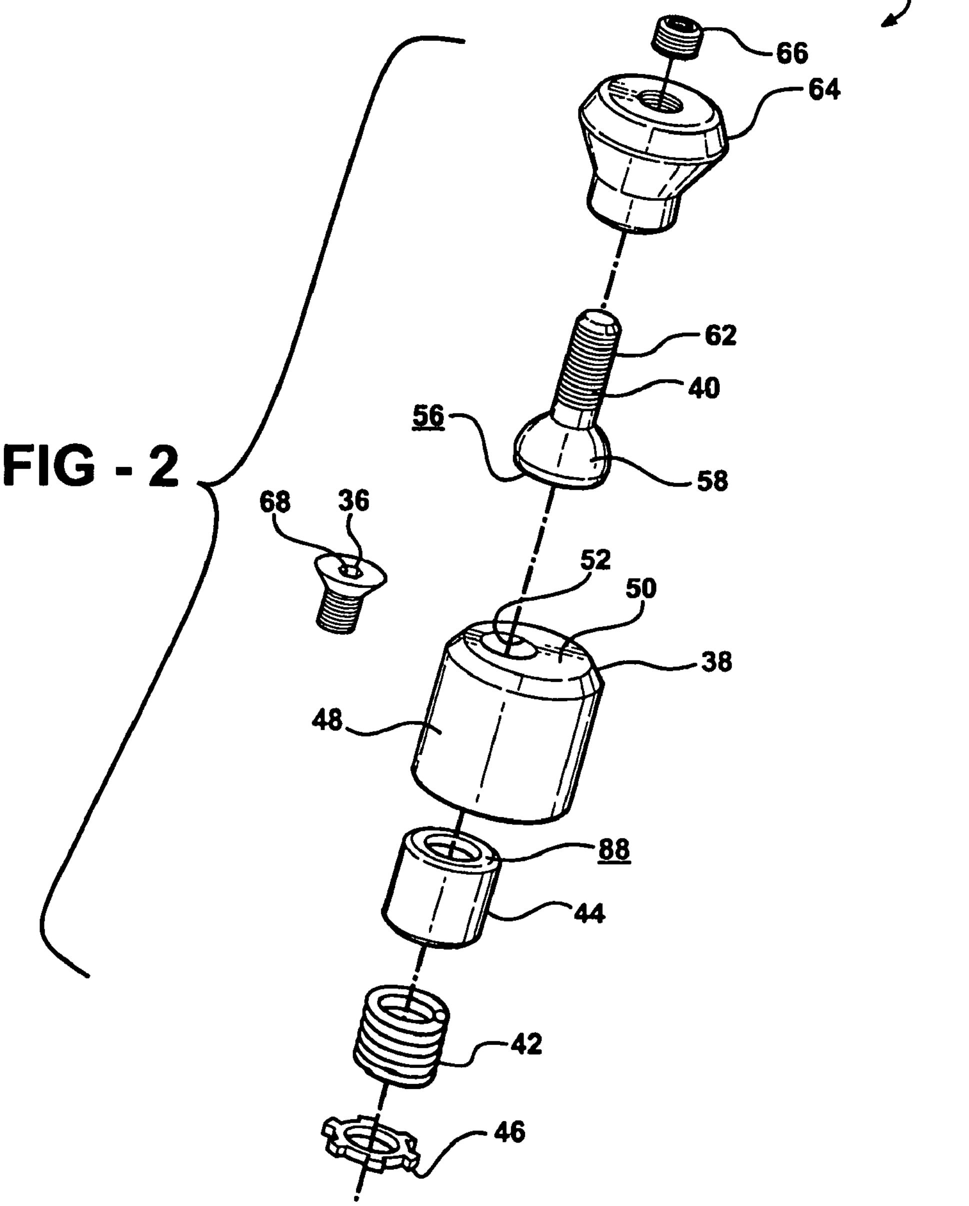
FIG. 2 is an exploded perspective view of a spring pin assembly used in the work support apparatus.
Figure 3:
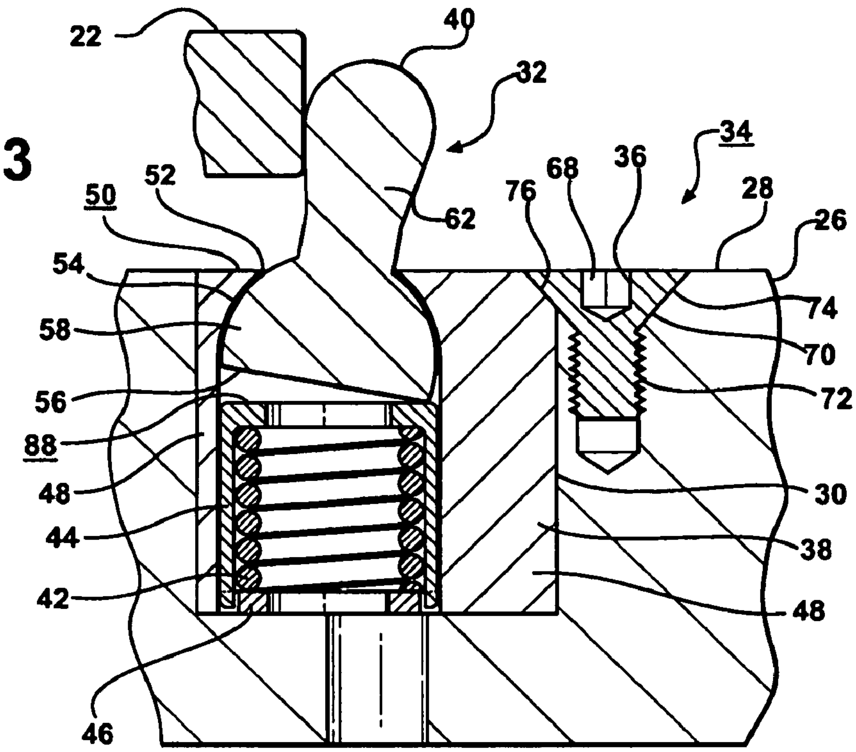
FIG. 3 is a fragmentary cross sectional view of the spring pin assembly in the work support apparatus.

Referring to FIGS. 2 and 3, the spring pin assembly (32) includes a circular housing (38) positioned within the recess (30). A retaining pin (40) is disposed within the circular housing (38). A compression spring (42) is disposed within the housing and below the retaining pin (40) for urging the retaining pin (40) upward. A spring cup (44) is disposed between the compression spring (42) and the retaining pin (40). A locking device (46) secures the retaining pin (40), the spring cup (44), and the compression spring (42) within the housing.

The circular housing (38) includes a side wall (48) and a top wall (50). The top wall (50) includes a circular opening (52) therethrough and an inner domed surface (54). The inner domed surface (54) extends from the side wall (48) upwardly to the circular opening (52). The circular opening (52) in the top wall (50) may be concentric with the circular housing (38) so that the retaining pin (40) is positioned in the center of the housing. Alternatively, the circular opening (52) may be eccentric with the circular housing (38) so that the retaining pin (40) is positioned in spaced relationship to the center of the circular housing (38). This eccentric configuration of the circular opening (52) in the circular housing (38) allows the position of the spring pin assembly (32) to vary for accommodating different sized work pieces (22).

The retaining pin (40) is disposed within the circular housing (38) and includes a flat bottom surface (56) and a semi-spherical bottom portion (58). The semi-spherical bottom portion (58) extends upwardly from the flat bottom surface (56) of the retaining pin (40) to the circular opening (52) of the top wall (50). The semi-spherical bottom portion (58) has a radius equal to a radius of the domed inner surface (54) so that the semi-spherical bottom portion (58) does not pass through the circular opening (52). The interaction between the domed inner surface (54) of the top wall (50) and the semi-spherical bottom portion (58) of the retaining pin (40) form a pivotable connection (60) therebetween. The pivotable connection (60) creates a seal for preventing metal fines from contaminating the spring pin assembly (32) during machining operations, thereby prolonging the life of the spring pin assembly (32).

The retaining pin (40) further includes a cylindrical upper portion (62) extending upwardly above the top surface (28) of the table (26) from the semi-spherical bottom portion (58). The cylindrical upper portion (62) engages the work piece (22) for biasing the work piece (22) against the stop (24).

The compression spring (42) is disposed within the housing and beneath the retaining pin (40) for urging the semi-spherical bottom portion (58) of the retaining pin (40) into engagement with the domed inner surface (54) of the top wall (50). The spring cup (44) is disposed between the compression spring (42) and the retaining pin (40) for transmitting forces between a flat upper surface (88) of the compression spring (42) and the flat bottom surface (56) of the retaining pin (40). the locking device secures the compression spring (42), the spring cup (44), and the retaining pin (40) within the housing.

Figure 4:
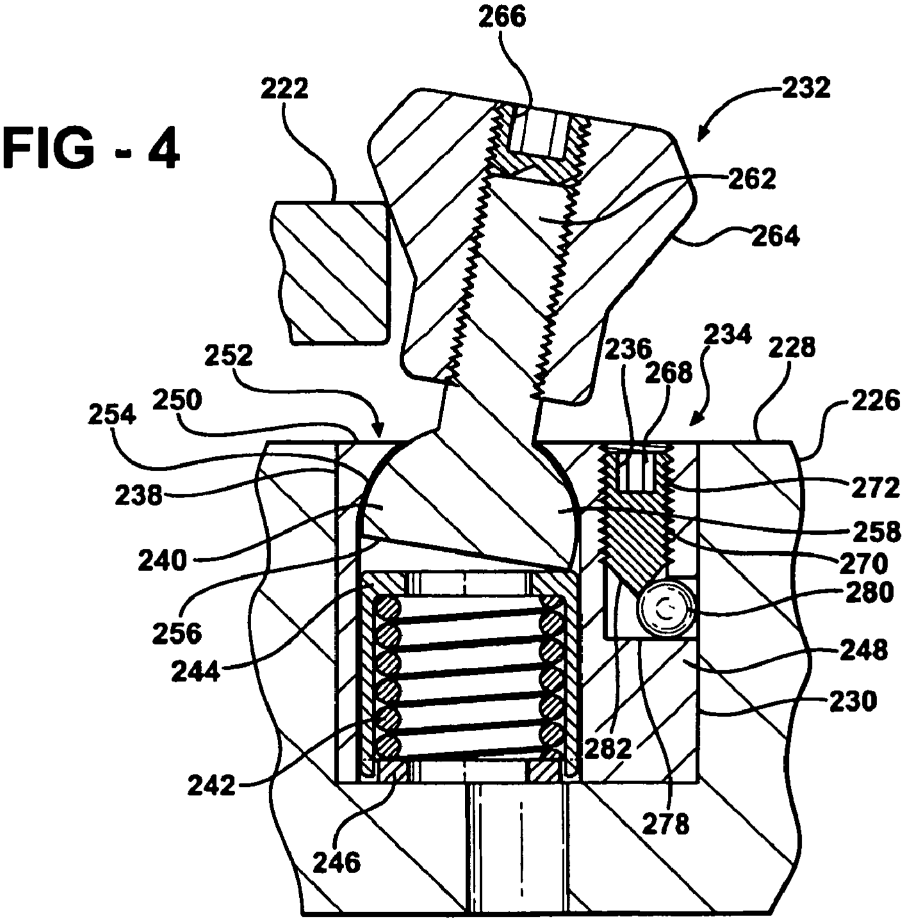
FIG. 4 is a fragmentary cross sectional view of a second embodiment of the spring pin assembly in the work support apparatus.

As best shown in FIGS. 3 and 4, as the retaining pin (40) is moved laterally out of its upright position, the flat bottom surface (56) of the retaining pin (40) contacts the spring cup (44) at the outer periphery thereof. The further out of position the retaining pin (40) is moved, the more the compression spring (42) is compressed. The compression spring (42) supplies a reactionary force upward through the spring cup (44) to the outer periphery of the flat bottom surface (56) of the retaining pin (40). In this manner, the upward reactionary force is concentrated at the outer periphery of the flat bottom surface (56) of the retaining pin (40) to act as a lever against the retaining pin (40). The upward reactionary force at the outer periphery of the flat upper surface urges the retaining pin (40) back to its original upright position where the flat bottom surface (56) of the retaining pin (40) rests upon the flat upper surface (88) of the spring cup (44).

Referring to FIG. 2, the spring pin assembly (32) may include a retaining head (64) slideably disposed over the cylindrical upper portion (62) of the retaining pin (40). A set screw (66) is in threaded engagement with the cylindrical upper portion (62) of the retaining pin (40). The set screw (66) secures the retaining head (64) to the retaining pin (40). Alternatively, the cylindrical upper portion (62) of the retaining pin (40) may be formed in the shape of a club.

Referring back to FIG. 3, the tool receiving device (36) is defined by a tool void (68). The tool void (68) receives the tool through the plane of the top surface (28). The tool engages the holding mechanism, generally shown at (34), for operating the holding mechanism (34) and installing or removing the spring pin assembly (32) from the recess (30). The spring pin assembly (32) is therefore repeatably installable and removable from the top surface (28) of the table (26).

In the preferred embodiment, as shown in FIGS. 2 and 3, the holding mechanism, generally shown at (34), includes a fastener (70) and a threaded bore (72) for receiving the fastener (70). The threaded bore (72) is disposed within the table (26) and adjacent the recess (30). The fastener (70) includes the tool void (68) therein such that the tool void (68) receives the tool for advancing or retracting the fastener (70) within the threaded bore (72). The fastener (70) includes a tapered head (74) for engaging a chamfered edge (76) on the circular housing (38) of the spring pin assembly (32). When in a secured position, the tapered head (74) of the fastener (70) is below the top surface (28) of the table (26). The tapered head (74) of the threaded fastener (70) is tightened against the chamfered edge (76) of the spring pin assembly (32) such that when secured, the threaded fastener (70) secures the spring pin assembly (32) tightly within the recess (30). Preferably, the circular opening (52) is eccentric with the housing. The eccentric circular opening (52) allows the retaining pin (40) to rotate about the center of the spring pin assembly (32), thereby allowing for minor adjustments in the spring pin assembly (32) for accommodating various sized work pieces (22).

Figure 5:
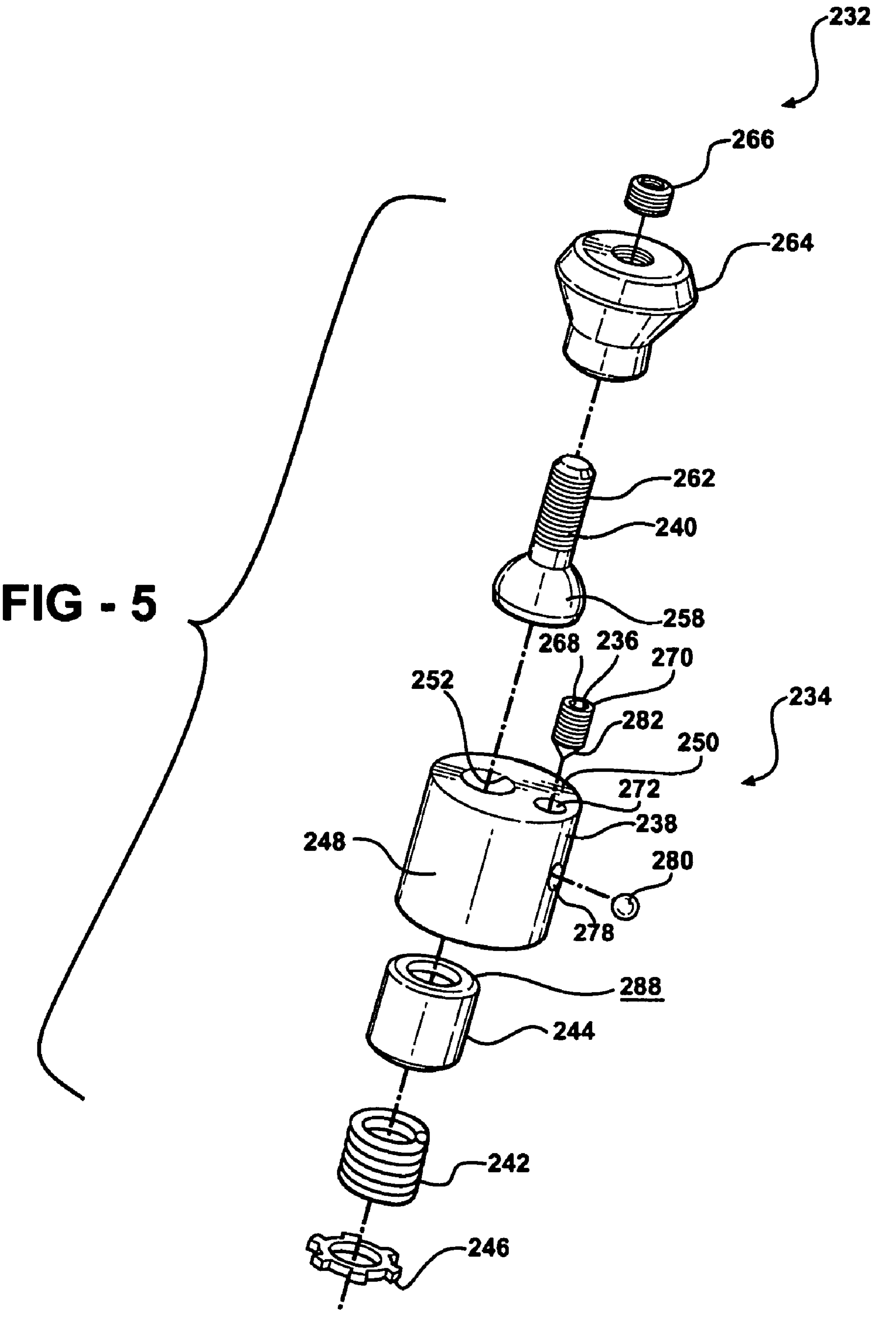
FIG. 5 is an exploded perspective view of the second embodiment of the spring pin assembly.

Referring to FIGS. 4 and 5, a second embodiment of the spring pin assembly is generally shown at (232). Elements of the second embodiment, which are similar to the elements of the preferred embodiment, are indicated by the same numeral used in the preferred embodiment preceded by the number 2. In the second embodiment, the holding mechanism (234) includes a fastener (270) and a threaded bore (272) in the circular housing (238) of the spring pin assembly (232). The threaded bore (272) extends perpendicular to the top surface (228) of the table (226). A horizontal bore (278) extends from the bottom of the threaded bore (272) parallel to the top surface (228). The horizontal bore (278) is open to an outer surface of the side wall (248) of the circular housing (238) and exposed to the recess (230). A locking ball (280) is disposed within the horizontal bore (278) for engaging the recess (230). The fastener (270) includes the tool void (268) therein such that the tool void (268) receives the tool for advancing or retracting the fastener (270) within the threaded bore (272). The fastener (270) also includes a conical bottom end (282) for engaging the locking ball (280) and urging the locking ball (280) outwardly of the horizontal bore (278) and into frictional engagement with the recess (230). When the spring pin assembly (232) is tightly secured within the recess (230), the fastener (270) is below the top surface (228) of the table (226).

Figure 6:
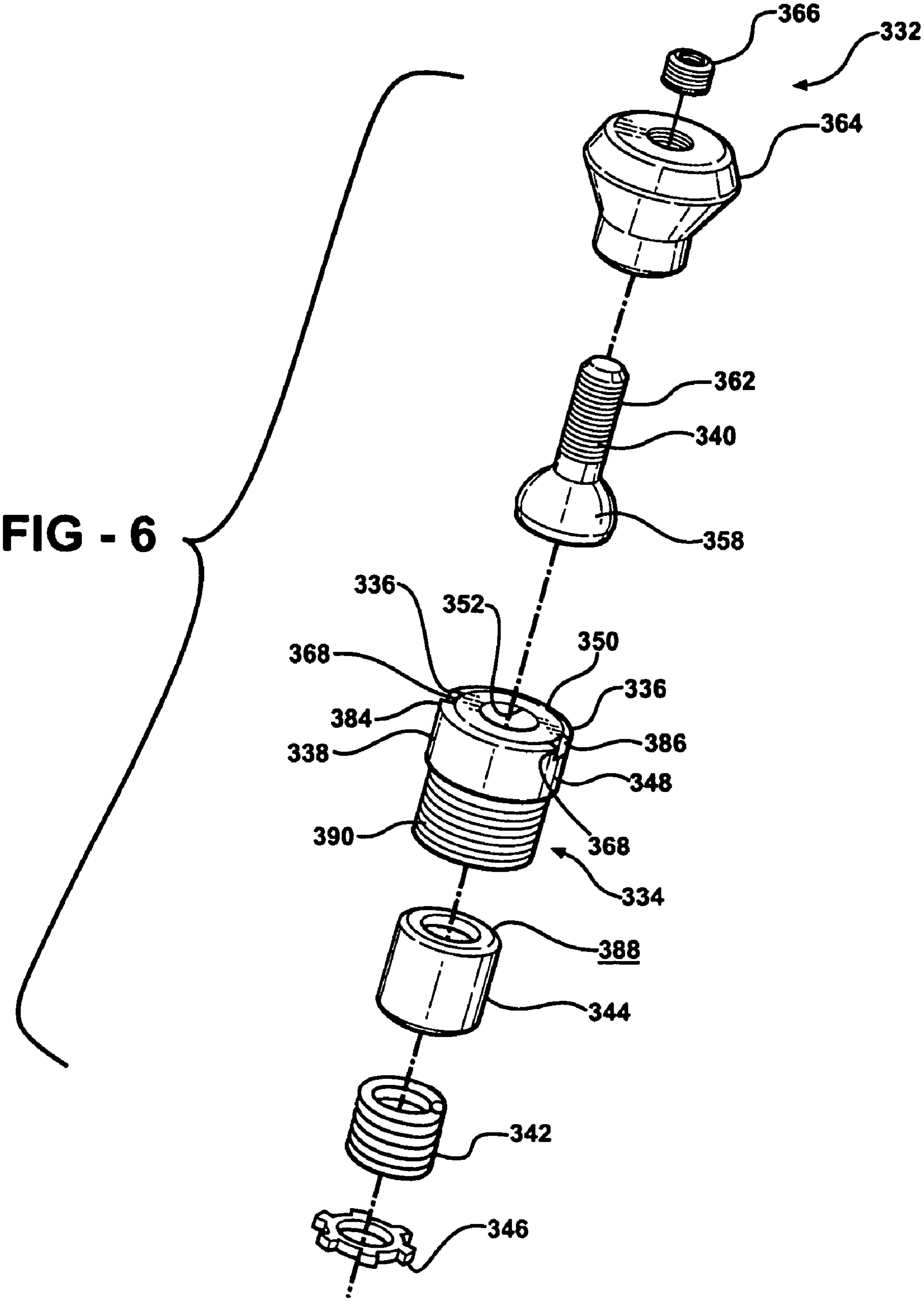
FIG. 6 is an exploded perspective view of a third embodiment of the spring pin assembly.

Referring to FIG. 6, a third embodiment of the spring pin assembly is generally shown at (332). Elements of the third embodiment, which are similar to the elements of the preferred embodiment, are indicated by the same numeral used in the preferred embodiment preceded by the number 3. In the third embodiment, the spring pin assembly (332) includes the tool void (368) therein. The tool void (368) is further defined as a first tool void (384) and a second tool void (386) in opposing sides of the spring pin assembly (332). The first (384) and second (386) tool voids are located in the outer surface of the top wall (350) near the outer periphery of the circular housing (338). The holding mechanism (334) includes threads (390) in the spring pin assembly (332) in threaded engagement with the recess (330). The spring pin assembly (332) is installed or removed by inserting the tool into the first (384) and second (386) tool voids and rotating the spring pin assembly (332) clockwise or counter clockwise for installing or removing the spring pin assembly (332). When the spring pin assembly (332) is tightly secured within the recess (330) of the table (326), the top wall (350) of the circular housing (338) is below the top surface (328) of the table (326). In the third embodiment, the circular opening (352) is concentric with the circular housing (338). The concentric circular opening (352) allows the retaining pin (340) to maintain its position as the spring pin assembly (332) is threaded into the recess (330) in the table (326).

The foregoing invention has been described in accordance with the relevant legal standards; thus, the description is exemplary rather than limiting in nature. Variations and modifications to the disclosed embodiments may become apparent to those skilled in the art and do come within the cope of the invention. Accordingly, the scope of legal protection afforded this invention can only be determined by studying the following claims. In addition, the reference numerals in the claims are merely for convenience and are not to be read in any way as limiting.

What is claimed is:

1. A spring pin assembly (232) for disposition within a recess (230) of a table (226) to bias a work piece (222) against a stop (224), said assembly (232) comprising:

a circular housing (238) including a top wall (250) and a side wall (248);

a retaining pin (240) pivotably supported by and partially disposed within said housing (238);

a pivotal connection between said housing (238) and said retaining pin (240) for biasing the work piece (222) against the stop (224);

a holding mechanism (234) for removably retaining said housing (238) in the recess (230) of the table (226) without interfering with movement of the work piece (222) over the table (226); and a tool receiving device (236) disposed below said top wall (250) of said housing (238) for engaging said holding mechanism (234) with a tool below said top wall (250) for installing and removing said housing (238) from the recess (230) in the table (226).

2. An assembly (232) as set forth in claim 1 wherein said tool receiving device (236) is defined by a tool void (268) for receiving the tool.

3. An assembly (232) as set forth in claim 2 wherein said holding mechanism (234) includes a fastener (270) with said tool void (268) therein for receiving the tool and operating said holding mechanism (234).

4. An assembly (232) as set forth in claim 3 wherein said holding mechanism (234) includes a threaded bore (272) defined by said housing (238) and in threaded engagement with said fastener (270).

5. An assembly (232) as set forth in claim 4 wherein said holding mechanism (234) includes a horizontal bore (278) defined by said housing (238) and extending from said side wall (248) of said housing (238) to said threaded bore (272).

6. An assembly (232) as set forth in claim 5 wherein said holding mechanism (234) includes a locking ball (280) disposed within said horizontal bore (278) for engaging the recess (230).

7. An assembly (232) as set forth in claim 6 wherein said fastener (270) includes a conical bottom end (282) engaging said locking ball (280) for urging said locking ball (280) outwardly of said horizontal bore (278) and into frictional engagement with the recess (230).

8. An assembly (232) as set forth in claim 1 wherein said top wall (250) of said housing (238) defines a circular opening (252) therethrough and wherein said retaining pin (240) includes a flat bottom surface (256) and a semi-spherical bottom portion (258) extending upwardly from said flat bottom surface (256) to said circular opening (252) and disposed within said housing (238) adjacent said top wall (250) wherein said semi-spherical bottom portion (258) includes a diameter larger than said circular opening (252).

9. An apparatus (232) as set forth in claim 8 wherein said pivotal connection includes a domed inner surface (254) in said top wall (250) extending from said side wall (248) upwardly to said circular opening (252) for engaging said semi-spherical bottom portion (258) of said retaining pin (240).

10. An apparatus (232) as set forth in claim 9 wherein said pivotal connection includes a compression spring (242) for urging said semi-spherical bottom portion (258) of said retaining pin (240) into pivotable engagement with said domed inner surface (254) of said top wall (250).

11. An apparatus (232) as set forth in claim 10 wherein said pivotable connection includes a spring cup (244) having a flat upper surface (288) parallel said top wall (250) of said housing (238) for transmitting forces between said compression spring (242) and said flat bottom surface (256) of said retaining pin (240).

12. An apparatus (232) as set forth in claim 11 further comprising a locking device (246) for securing said compression spring (242) and said spring cup (244) and said retaining pin (240) within said housing (238).

13. An apparatus (232) as set forth in claim 8 wherein said retaining pin (240) includes a cylindrical upper portion (262) extending upwardly from said semi-spherical bottom portion (258) and through said circular opening (252) for engaging the work piece (222).

14. An apparatus (232) as set forth in claim 13 further comprising a retaining head (264) slideably disposed over said cylindrical upper portion (262) of said retaining pin (240).

15. An apparatus (232) as set forth in claim 14 further comprising a head fastener (266) in threaded engagement with said cylindrical upper portion (262) of said retaining pin (240) for securing said retaining head (264) to said retaining pin (240).

16. An apparatus (232) as set forth in claim 8 wherein said circular opening (252) is concentric with said circular housing (238).

17. An apparatus (232) as set forth in claim 8 wherein said circular opening (252) is eccentric with said circular housing (238).

* * * * *